US006268082B1

(12) United States Patent
Hiruma et al.

(10) Patent No.: US 6,268,082 B1
(45) Date of Patent: Jul. 31, 2001

(54) PRODUCTION METHOD OF ACTIVE MATERIAL FOR POSITIVE ELECTRODE OF ALKALINE SECONDARY BATTERY, POSITIVE ELECTRODE USING THE ACTIVE MATERIAL AND PRODUCTION METHOD OF ALKALINE SECONDARY BATTERY USING THE POSITIVE ELECTRODE

(75) Inventors: Masayoshi Hiruma, Yokohama; Naomi Bando, Kawasaki; Kunihiko Miyamoto, Tokyo; Makoto Wakabayashi, Narashino, all of (JP)

(73) Assignee: Toshiba Battery Co., Ltd., Tokyo (JP)

( * ) Notice: Subject to any disclaimer, the term of this patent is extended or adjusted under 35 U.S.C. 154(b) by 0 days.

(21) Appl. No.: 09/266,938

(22) Filed: Mar. 12, 1999

(30) Foreign Application Priority Data

Mar. 13, 1998 (JP) .................................................. 10-063142
Dec. 1, 1998 (JP) .................................................. 10-342170
Dec. 24, 1998 (JP) .................................................. 10-367375

(51) Int. Cl.[7] .............................. H01M 4/58; H01M 6/04; H01M 4/32; H01M 4/52; H01M 6/00
(52) U.S. Cl. ..................... 429/218.1; 429/218; 429/206; 429/223; 29/623.1
(58) Field of Search .................................. 429/206, 223, 429/218.1; 29/623.1

(56) References Cited

U.S. PATENT DOCUMENTS

| 4,808,005 | | 2/1989 | Lewis et al. . | |
| 4,985,318 | * | 1/1991 | Oshitani et al. | 429/223 |
| 5,451,475 | * | 9/1995 | Ohta et al. | 429/212 |
| 5,571,636 | * | 11/1996 | Ohta et al. | 429/218 |
| 5,744,259 | * | 4/1998 | Ohta et al. | 429/59 |
| 6,007,946 | * | 12/1999 | Yano et al. | 429/223 |

FOREIGN PATENT DOCUMENTS

| 0554649A1 | | 8/1993 | (EP) . |
| 0727835A1 | | 8/1996 | (EP) . |
| 0 727 835 | * | 8/1996 | (EP) . |
| 0752726A2 | | 1/1997 | (EP) . |
| 0 752 726 | * | 1/1997 | (EP) . |
| 0757395A1 | | 2/1997 | (EP) . |
| 0 757 395 | * | 2/1997 | (EP) . |

OTHER PUBLICATIONS

Patent Abstracts of Japan, vol. 097, No. 003, Mar. 31, 1997—abstract for JP 08–301619 A, Matsushita Electric Ind. Co., Ltd, Nov. 19, 1996.

* cited by examiner

*Primary Examiner*—Tom Dunn
*Assistant Examiner*—Zidia T. Pittman
(74) *Attorney, Agent, or Firm*—Oblon, Spivak, McClelland, Maier & Neustadt, P.C.

(57) ABSTRACT

The present invention is to provide a production method of an active material for an alkaline secondary battery comprising: a step of mixing particles comprising particles mainly containing nickel hydroxide and particles of a metal cobalt or a cobalt compound in a mixer with a sealed structure comprising a heating means in the presence of oxygen and an alkaline aqueous solution while heating. An active material produced by the method allows a high utilization. And a battery assembled with a positive electrode using the active material has an excellent high ratio discharge characteristic, and hardly causes the capacity decline even at the time of recharging after leaving in the over discharge state for a long time.

21 Claims, 2 Drawing Sheets

PRODUCTION METHOD OF ACTIVE MATERIAL FOR POSITIVE ELECTRODE OF ALKALINE SECONDARY BATTERY, POSITIVE ELECTRODE USING THE ACTIVE MATERIAL AND PRODUCTION METHOD OF ALKALINE SECONDARY BATTERY USING THE POSITIVE ELECTRODE

BACKGROUND OF THE INVENTION

1. Field of the Invention

The present invention relates to a production method of an active material for a positive electrode of an alkaline secondary battery, a positive electrode using the produced active material, and a production method of an alkaline secondary battery using the positive electrode, more specifically to a production method of an active material for a positive electrode having high utilization as an active material, unsusceptible to deterioration even in a long term storage, a positive electrode using the active material, and a production method of an alkaline secondary battery having an excellent high ratio discharge characteristic and capable of restraining the decline of the discharge capacity even at the time of recharging after leaving for a long time in an over discharge state.

2. Prior Art

Typical examples of alkaline secondary batteries include a nickel-hydrogen secondary battery and a nickel-cadmium secondary battery. In these batteries, a nickel electrode mainly comprising nickel hydroxide as the positive electrode active material is assembled as the positive electrode.

As the nickel electrode, two kinds, that is, a sintered type and a non-sintered type are known.

Among them, a non-sintered type nickel electrode is produced as follows.

A viscous paste mixture for positive electrode is prepared by kneading a nickel hydroxide powder which functions as an active material for a positive electrode and a binder such as carboxy methyl cellulose, methyl cellulose, sodium polyacrylate, and polytetrafluoroethylene with water. Then, the paste is filled or applied to a collector such as a three-dimensional substrate of a foamed nickel substrate, a net-like sintered substrate made of metal fibers or a non-woven fabric with the surface applied with nickel plating, and a two-dimensional substrate of a nickel punching sheet and an expand nickel, followed by a drying treatment and a press forming so that the above-mentioned paste mixture is filled and supported in the collector in the dry state.

Since a non-sintered type nickel electrode produced by above mentioned method has a higher filling density of a nickel hydroxide (active material) compared with a sintered type, it is advantageous in that a battery with a high discharge capacity can be provided.

With the above-mentioned nickel electrode as the positive electrode, an alkaline secondary battery is assembled as follows.

A generating element is produced by placing a separator having the electric insulating property and the liquid maintaining property between the above-mentioned nickel electrode and a predetermined negative electrode.

When the purposed alkaline secondary battery to be produced is a nickel-cadmium secondary battery, a negative electrode supporting a mixture for negative electrode having a cadmium compound such as a metal cadmium and a cadmium hydroxide as the negative electrode active material is used. When the purposed alkaline secondary battery to be produced is a nickel-hydrogen secondary battery, a negative electrode supporting a mixture for negative electrode mainly comprising a hydrogen absorbing alloy is used. As a separator, a non-woven fabric of a polyamide fiber or a non-woven fabric of a polyolefin fiber such as a polyethylene fiber and a polypropylene fiber, applied with a hydrophilic treatment can be used commonly.

The above-mentioned generating element is placed in a battery can with the bottom also serving as a negative terminal comprising a nickel plating steel plate, for example, and a predetermined amount of an alkaline electrolyte is filled therein. Examples of the alkaline electrolyte include, in general, an aqueous solution of sodium hydroxide, an aqueous solution of potassium hydroxide, an aqueous solution of lithium hydroxide, and an optional mixture thereof.

Then, after placing a positive electrode terminal at the opening of the battery can, the entirety is sealed so as to provide a battery.

The initial charging is conducted to the assembled battery so as to apply the activating treatment for the nickel hydroxide, which is the activate material, prior to the shipment. In general, the initial charging is conducted under the condition where quantity of electricity more than 100% of the theoretical capacity of the assembled nickel electrode can be charged.

In the above-mentioned nickel electrode, it is important to improve the conductivity within the active material (nickel hydroxide), and between the active material and the collector for improving the utilization of the active material.

In order to achieve the task, the following treatment has been adopted conventionally.

In preparing a paste mixture for a positive electrode, a predetermined amount of particles of a metal cobalt, a cobalt compound such as cobalt hydroxide, cobalt trioxide, cobalt tetroxide, and cobalt monoxide, or a mixture thereof are added as a conducting material so as to produce a powdery material mixed with the nickel hydroxide particles by a predetermined ratio to be used as the active material.

If a nickel electrode supporting the active material produced by above mentioned method is assembled in an alkaline secondary battery as the positive electrode, the metal cobalt or the cobalt compound contained in the above-mentioned powdery material is dissolved temporarily in the alkaline electrolysis solution as complex ions, and is distributed on the surface of the nickel hydroxide particles, which are the active material. At the time of the initial charging of the battery, the complex ions are oxidized earlier than the nickel hydroxide so as to be converted to an oxide of higher order such as oxycobalt hydroxide. It is precipitated among the nickel hydroxide particles, which are the active material, and between the active material layer and the collector so as to form a conductive matrix. Therefore, the collecting efficiency at the nickel electrode can be improved, and consequently, the utilization of the active material can be improved. In that case, with a larger number of contacting points between the above-mentioned conductive matrix and the nickel hydroxide particles, the utilization of the nickel hydroxide particles (active material) can further be improved.

Moreover, a method of treating the powdery material produced as mentioned above with a heat alkaline aqueous solution is also known.

Specifically, the above-mentioned powdery material is soaked in an alkaline aqueous solution so that the alkaline aqueous solution is applied or impregnated to the powdery material. Then, the entirety is filtrated so that the substance obtained by the filtration is heated at a predetermined temperature. According to the method, a part of the metal cobalt or the cobalt compound contained in the powdery material is dissolved in the heat alkaline aqueous solution as complex ions so that they homogeneously cover the surface of the particles mainly comprising the nickel hydroxide. Then, it is changed into an active material having factors of forming the above-mentioned conductive matrix.

However, in this method of treating the above-mentioned powdery material with the heat alkaline aqueous solution, the cobalt complex ions temporarily dissolved in the heat alkaline aqueous solution may be precipitated again in the cooling process of the heat alkaline aqueous solution so as to form particle aggregates by bonding adjacent particles with each other. Therefore, since the obtained treated substance is an assembly of the above-mentioned particle aggregates, if paste mixture for a positive electrode is prepared with the treated substance, the distribution state of the nickel hydroxide particles, which are the positive electrode active material in the paste, becomes uneven, and thus it is problematic in that the effective use as the active material cannot be realized.

As another method, for example, a method of using a powdery material prepared by introducing particle mainly comprising nickel hydroxide into an alkaline aqueous solution controlled to be in the range of pH 11 to 13 and gradually adding, for example, an aqueous solution of cobalt sulfate so as to cover the surface of the above-mentioned particles with the formed cobalt compound like cobalt hydroxide for the use as the active material can be presented.

According to the method, the surface of the nickel hydroxide particles can be covered with a small amount of a cobalt compound, however, a problem is involved in that the formation amount of the above-mentioned conductive matrix is reduced accordingly.

In either case, in order to improve the utilization of the active material, it is advantageous to make a larger amount of the conductive matrix by increasing the amount of the metal cobalt or the cobalt compound in the above-mentioned powdery material.

However, with a larger amount of the metal cobalt or the cobalt compound is included in the above-mentioned powdery material for improving the utilization of the active material, not only does the production cost of the nickel electrode increase, but also the relative ratio of the nickel hydroxide particles to serve as the positive electrode active material decreases, and thus it is disadvantageous for achieving a high capacity of the battery.

Taking the above-mentioned into the account, an active material capable of performing the effects even with a minimum amount of the metal cobalt or the cobalt compound is preferable as the active material.

In the case of a battery where a nickel electrode with a large amount of a metal cobalt or a cobalt compound is contained, the cobalt compound enters into the crystal structure of the nickel hydroxide particles under the over discharge state, and thus it is problematic in that the above-mentioned effects inherent to the cobalt compound, that is, the formation of the conductive matrix cannot proceed so as to disturb the improvement of the utilization of the active material.

Recently, with various kinds of electronic appliances provided in a portable form, a nickel-hydrogen secondary battery or a nickel-cadmium secondary battery to be used as the driving power source is strongly required not to cause the decline of the capacity even after leaving a long time, to show a high ratio discharge characteristic from the initial stage, and to show an excellent discharge characteristic even in a low temperature environment, in addition to have a high capacity.

In this case, in order to improve the high ratio discharge characteristic, it is known that a large amount of a metal cobalt or a cobalt compound in a nickel electrode, which is the positive electrode, is effective for improving the high ratio discharge characteristic.

However, these methods run counter to the above-mentioned achievement of the high capacity of the battery, and thus they are not a method for improving the large current discharge characteristic without sacrificing a high capacity.

On the other hand, the official gazettes of Japanese Patent Publication Laid-Open No. 8-195218 and 8-236145 disclose a method of conducting the initial charging in a high temperature until the metal cobalt or the cobalt compound included in the nickel electrode is oxidized completely into the oxycobalt hydroxide.

According to the method, since the metal cobalt or the cobalt compound included in the nickel electrode can contribute to the formation of the conductive matrix without loss, a high capacity of the battery can be realized with a small amount of the metal cobalt or the cobalt compound. Besides, since the formed conductive matrix is firmer than the conductive matrix formed at the time of the initial charging in a room temperature, an effect of hardly causing the decline of the capacity even after leaving can be achieved.

However, a problem is involved in that a high temperature atmosphere is required as the initial charging environment, and further, a longer initial charging time is needed so that the production cost as a whole is increased.

Furthermore, the official gazette of Japanese Patent Publication Laid-Open No. 9-73900 discloses a method of precipitating cobalt hydroxide on the surface of nickel hydroxide particles, fluidizing or dispersing the same in an open device of a hot air convection method, spraying an alkaline aqueous solution thereto and agitating the same in a hot air flow such as hot air so as to convert the above-mentioned cobalt hydroxide into an oxide of higher order.

Since an oxide of higher order of the cobalt is already formed on the surface of the nickel hydroxide particles produced by the method, itself is an active material with an improved utilization. A battery with the nickel hydroxide particles assembled as the positive electrode active material has the above-mentioned conductive matrix formed already at the time of completing the assembly.

However, the method disclosed in the official gazette of Japanese Patent Publication Laid-Open No. 9-73900 has the following problems.

The first problem is that the particles prepared by making the cobalt compound precipitate on the surface of the nickel hydroxide particles should be used as the starting material. In order to make the cobalt compound precipitate, as disclosed in the embodiments of the above-mentioned prior art, complicated procedure is required in terms of the concentration of the chemicals to be used the pH adjustment of the reaction field, control of the reaction time, and the like, and thus the conditions requiring a higher cost are needed so that it is problematic industrially.

Moreover, since the heat treatment is conducted in a hot air convection method, the heat efficiency is poor, and thus it is another factor to raise the production cost. Besides, since an open system is required as the field for converting cobalt hydroxide into an oxide of higher order in a hot air convention method, a problem is involved in that an alkaline aqueous solution can easily be evaporated. With the evaporation of the alkaline aqueous solution, the amount of the cobalt compound precipitated on the surface of the nickel hydroxide particles, dissolved in the alkaline aqueous solution is reduced, and thus it disturbs the re-precipitation of the dissolved cobalt compound as an oxide of higher order.

As an actual problem, in a battery assembled with a nickel electrode provided using an active material produced in the method, the utilization of the active material is low, and furthermore, a problem of decline of recovering the capacity after the storage in a high temperature environment or after a long term storage is caused.

Moreover, in order to improve the heat efficiency at the time of reaction in the above-mentioned method, the flow amount of the hot air can be increased, but such a measure cannot be adopted since it will promote evaporation of the alkaline aqueous solution.

As heretofore mentioned, in the above-mentioned prior arts, although nickel hydroxide particles having a factor of a conductive matrix for improving the utilization of the active material when used in a nickel electrode already formed can be produced, the above-mentioned various problems are involved.

OBJECTS AND SUMMARY OF THE INVENTION

An object of the present invention is to provide a production method of an active material for a positive electrode with a high utilization, without the risk of causing deterioration even after a long term storage.

Another object of the present invention is to provide a production method of an active material for a positive electrode capable of reducing the content ratio of the metal cobalt or the cobalt compound to be used in the production of the active material containing the metal cobalt or the cobalt compound to the minimum level, and capable of forming an oxide of higher order of the cobalt on the surface of the nickel hydroxide particles at a low cost even if the nickel hydroxide particles and the particles of the cobalt compounds are used independently, unlike the above-mentioned prior art disclosed in the official gazette of Japanese Patent Publication Laid-Open No. 9-73900.

Still another object of the present invention is to provide a positive electrode using the above-mentioned active material.

Yet another object of the present invention is to provide a production method of an alkaline secondary battery having an excellent high ratio discharge characteristic, without the risk of declining the discharge capacity even at the time of recharging after leaving for a long time in the over discharge state.

Still another object of the present invention is to provide a production method of an alkaline secondary battery capable of omitting the initial charging after the battery assembly, or capable of reducing the charging time if the initial charging is conducted.

In order to achieve the above-mentioned objects, the present invention provides a production method of an active material for a positive electrode of an alkaline secondary battery comprising:

a step of mixing particles comprising particles mainly containing nickel hydroxide and particles of a metal cobalt or a cobalt compound in a mixer with a sealed structure having a heating means in the presence of oxygen and an alkaline aqueous solution while heating.

Moreover, the present invention provides a positive electrode having the mixture mainly containing the active material for positive electrode produced by the above-mentioned method supported on the collector.

Furthermore, the present invention provides a production method of an alkaline secondary battery comprising:

a step of pouring a generating element comprising the above-mentioned positive electrode, a separator and a negative electrode and accommodating the same in a battery can;

a step of pouring an alkaline electrolysis solution into the battery can with a liquid ratio corresponding to 0.5 to 1.6 $cm^3/Ah$ with respect to the theoretical capacity (unit: Ah) of the positive electrode, and sealing the battery can for assembling the battery precursor; and a step of conducting the initial charging to the battery precursor.

DETAILED DESCRIPTION OF THE INVENTION

The production method of an active material for a positive electrode according to the present invention will be explained.

In the present invention, an active material for a positive electrode is produced in a mixer having a heating means.

Figure 1:
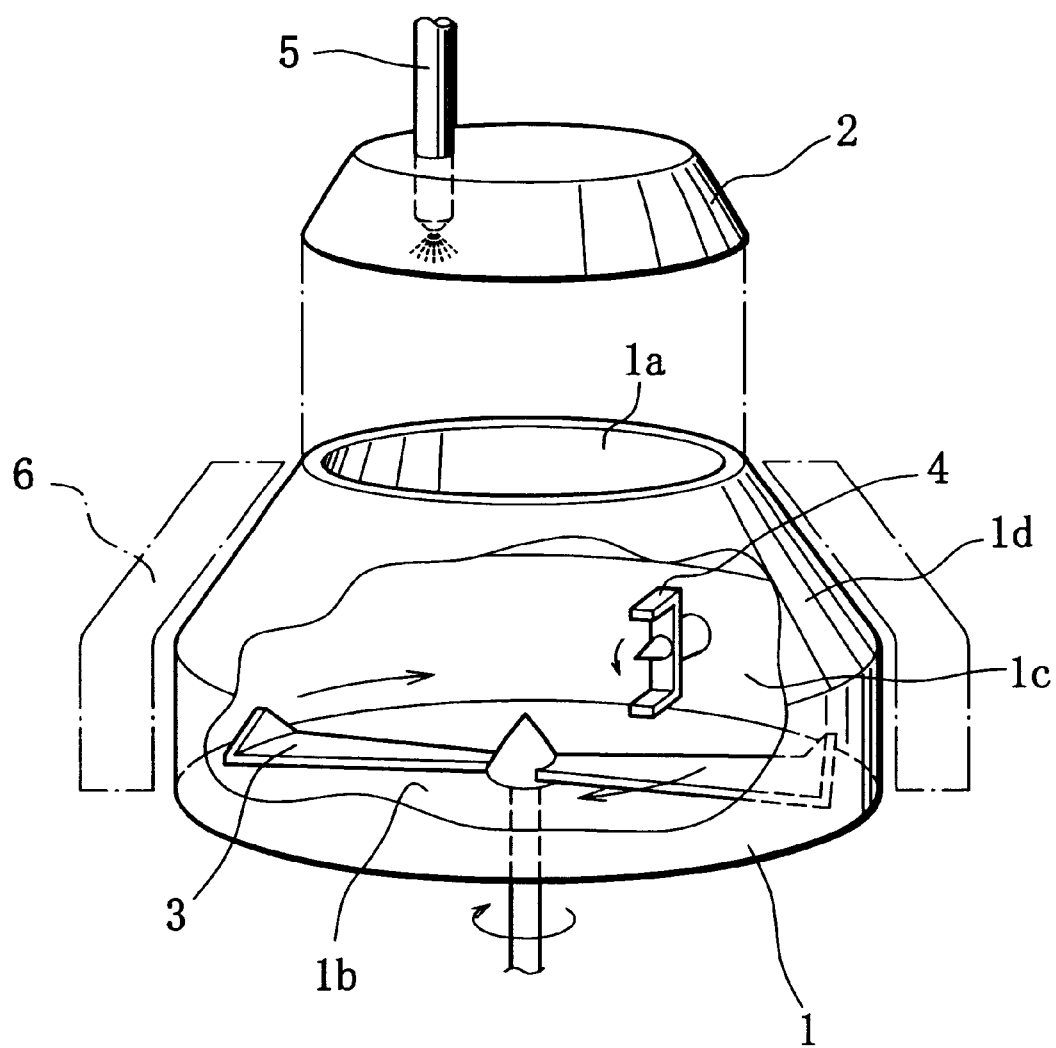
FIG. 1 is a partially notched perspective view of an embodiment of a mixer to be used in the production of an active material for a positive electrode of the present invention.

An example of the mixer structure to be used is shown in FIG. 1.

The mixer comprises a mixer main body 1 with the open upper part and a lid member 2 provided detachably to the upper part opening 1a thereof. A horizontally rotatable stirring blade 3 is provided at the bottom part 1b of the mixer main body 1. Furthermore, a vertically rotatable chopper blade 4 is provided on the inner wall 1c in the vicinity of the bottom part 1b. A part 1d of the mixer main body above the chopper blade 4 is a cylindrical member with a circular truncated conical shape as a whole.

On the other hand, the lid member 2 having a hat-like shape as a whole is provided with a nozzle 5 for supplying an alkaline aqueous solution. The nozzle 5 may be provided in the mixer main body 1.

Therefore, by putting the lid member 2 on the upper opening 1a of the mixer main body 1 so as to be fixed to the mixer main body, the mixer as a whole can have a sealed structure with the sealed space formed internally.

The sealed structure in the present invention refers to the state with a substantially sealed space is formed internally. For example, the case mounted with a member for connecting with a device for supplying an alkaline aqueous solution such as nozzle 5 as illustrated is also referred to as the sealed structure.

The mixer is provided with a heating means to be described later. By the operation of the heating means, the temperature of the subject to be mixed in the mixer can be controlled at a certain value.

A heating means may be a heating-cooling jacket 6 surrounding at least the outer periphery of the mixer main body 1 as shown in FIG. 1, however, a device for irradiating a radiation beam to the particles later described in the mixer is further preferable. Or both can be used in combination.

The radiation beam in the present invention includes a microwave in addition to a heat beam such as an infrared ray and a far infrared ray.

Therefore, as the latter heating device, a device for irradiating an infrared ray or a far infrared ray and a magnetoron for generating a microwave can be presented. In particular, a magnetoron for generating a microwave with a 1,000 MHz to 100 GHz frequency can be used preferably.

By using the mixer, an active material for a positive electrode of the present invention can be produced as follows, using the particles later described.

The particles in the present invention refer to a mixture of particles mainly containing nickel hydroxide and particles of a metal cobalt or a cobalt compound, or an agglomerate of particles with the surface of particles mainly containing nickel hydroxide adhered with a metal cobalt or a cobalt compound as disclosed in the official gazette of Japanese Patent Publication Laid-Open No. 9-73900. The explanation hereinafter will be given for the former particles.

A predetermined amount of nickel hydroxide particles and particles of a metal cobalt or a cobalt compound (hereinafter referred to as cobalt compound particles) is placed in the mixer main body 1. By closing the lid member 2, the sealed mixer structure is formed. The horizontal blade 3 is operated, and at the same time, the chopper blade 4 is operated.

Since the ascending driving force and the centrifugal force are applied to the mixture of the introduced particles by the rotation of the horizontal blade 3, the mixture (the particles) repeats the movement of ascending along the inner wall of the mixer main body 1 while turning and dropping from the lid member 2 so as to agitate and evenly mix the mixture in the process. Even if an aggregate (lump) is formed in the ascending mixture, the aggregate can be pulverized by the vertical rotation of the chopper blade 4 provided on the inner wall 1c of the mixer main body, the size of the mixture obtained after agitation and mixing can be homogeneous.

In the present invention, the heating means 6 is operated in the state where the inside of the mixer main body 1 is filled with an oxygen-including atmosphere such as atmosphere. And a heat treatment is applied for controlling the temperature of the agitated and mixed mixture at a predetermined temperature, and at the same time, an alkaline aqueous solution of a predetermined concentration is supplied from the nozzle 5 provided in the lid member 2 so that the mixer with the sealed structure can operate in the above-mentioned embodiment.

In the process, the nickel hydroxide particles and the cobalt compound particles can be mixed homogeneously, at the same time, the supplied alkaline aqueous solution is adhered on the surface of the mixture, the reaction field where the alkaline aqueous solution, and the cobalt compound particles and oxygen coexist is formed on the surface of the nickel hydroxide particles. As a result, the cobalt compound particles are converted to an oxide of higher order so as to cover the surface of the nickel hydroxide particles.

As the cobalt compound particles, metal cobalt particles, cobalt hydroxide particles, cobalt trioxide particles, cobalt tetroxide particles, and cobalt monoxide particles can be used alone, or as a mixture of two or more.

In this case, the amount of the cobalt compound particles in the mixed particles is preferably set in the range from 0.5 to 20% by weight. With less than 0.5% by weight, the above-mentioned formation of the conductive matrix at the time of the initial charging of the battery assembled with a nickel electrode for supporting the obtained active material is insufficient and thus the utilization of the active material cannot be improved. On the other hand, with more than 20% by weight, the relative ratio of the nickel hydroxide particles in the active material is reduced so that the discharge capacity of the battery is lowered.

Examples of the alkaline aqueous solution to be used include an aqueous solution of a sodium hydroxide, an aqueous solution of potassium hydroxide, and a mixture thereof further including an aqueous solution of lithium hydroxide.

It is preferable to set the concentration of the alkaline aqueous solution in the range from 1 to 14N. With a low concentration lower than 1N, the dissolution ability with respect to the cobalt compound particles contained in the mixture becomes low so that the formation of the above-mentioned conductive matrix cannot be formed sufficiently, and thus the utilization of the active material cannot be improved. On the other hand, with a high concentration higher than 14N, the viscosity of the alkaline aqueous solution becomes too high to sufficiently permeate into the inside of the particles and thus the cobalt compound particles cannot be dissolved sufficiently.

The amount of the alkaline aqueous solution is preferably set at 5 to 20 parts by weight with respect to 100 parts by weight of the mixed particles. With less than 5 parts by weight, the entirety of the cobalt compound particles contained in the mixed particles can hardly dissolved and thus the utilization of the obtained active material cannot be improved, and further, the capacity recovery ratio after storage of a battery produced therewith cannot be improved. With more than 20 parts by weight, the mixed particles are granulated. A preferable amount is from 10 to 15parts by weight with respect to 100 parts by weight of the mixed particles.

As the heating means 6 for heating the above-mentioned particles while agitating and mixing, a heating-cooling jacket provided outside the mixer main body 1 for indirectly heating the inside particles can be used. However, a device for directly irradiating a radiation beam to the inside particles such as an infrared ray, a far infrared ray, or a microwave is preferable. In particular, a magnetoron for irradiating a microwave is a preferable device. Or both can be used in combination.

The microwave vibrates water molecules which exist surrounding each particle contained in the mixed particles by the irradiation thereof, allowing homogeneous heating of the mixed particles themselves. Moreover, it is considered that the irradiation of the microwave generates defects in the crystal structure of the nickel hydroxide particles by the introduced energy, or change the state of the micro pores so as to enlarge the surface activity of the nickel hydroxide particles after treatment.

Figure 2:
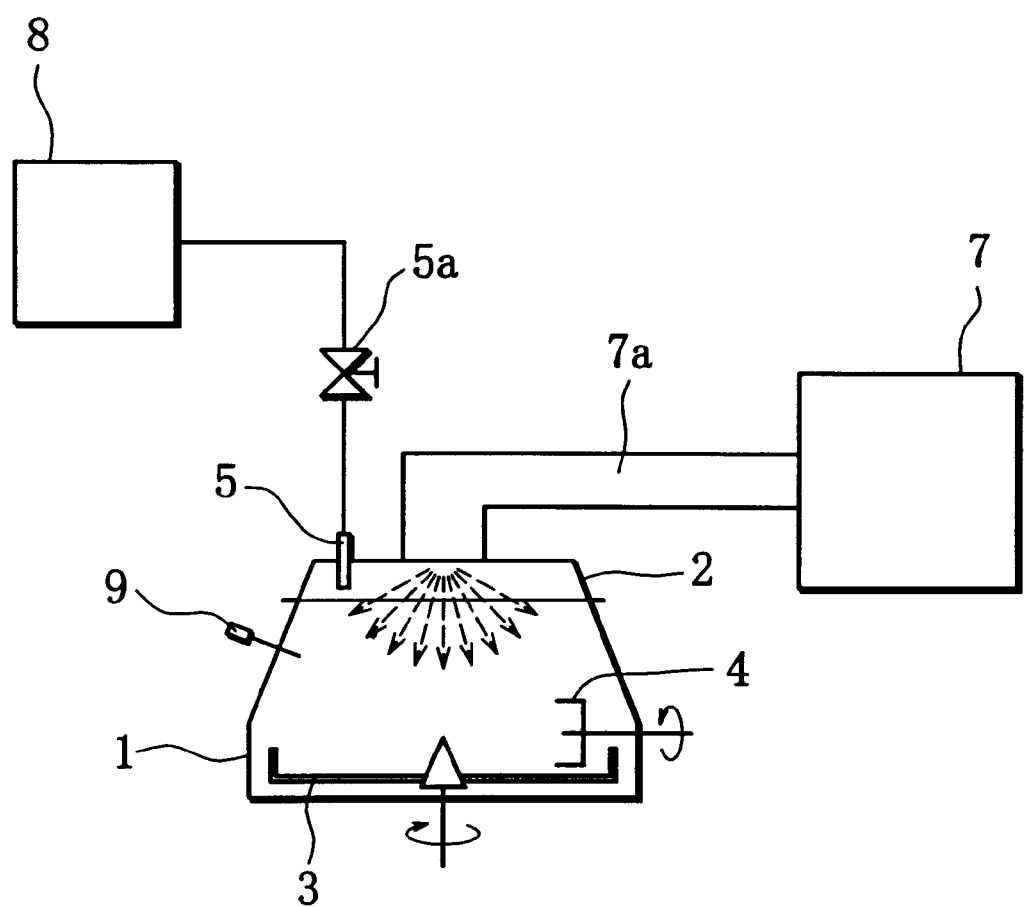
FIG. 2 is a schematic diagram of a device for producing an active material for a positive electrode of the present invention, using a microwave.

An example of a production device for heating the mixed particles with a magnetoron is shown in FIG. 2.

In the device, a wave guide 7a is mounted on the upper part of the lid member 2 so that the microwave generated by the magnetoron 7 can be irradiated into the sealed space in the mixer through the wave guide 7a. The wave guide 7a may be provided on the mixer main body 1.

This device is operated as follows. As mentioned above, predetermined particles are placed in the mixer main body 1, the lid member 2 is closed to have the sealed structure in the mixer. By driving the horizontal blade 3 and the chopper blade 4, at the same time, opening the valve 5a, a predetermined alkaline aqueous solution is supplied from the nozzle 5 into the mixer from a storage container 8.

By operating the magnetoron 7, a microwave of a predetermined frequency is irradiated from the wave guide 7a into the mixer so as to heat the mixed particles. The temperature is measured by a thermometer 9, with the signal fed back to the operating device of the magnetoron 7 for the output control so that the temperature of the mixed particles can be controlled.

The heat treatment by the microwave can be conducted for about 20 minutes while agitating the alkaline aqueous solution and the mixed particles.

Since the mixed particles are always agitated and are always heated homogeneously by the microwave in the process, the above-mentioned problem of the re-precipitation of the cobalt complex ions according to the cool down of the alkaline aqueous solution. As a result, the adhesion between the adjacent nickel hydroxide particles can be restrained, and thus particle aggregates cannot be generated in the obtained treated substance.

It is preferable to set the heat treatment temperature in the range from 35 to 160° C. With a temperature lower than 35° C., the dissolution amount of the metal cobalt or the cobalt compound contained in the mixed particles into the alkaline aqueous solution becomes small so that the formation of the above-mentioned conductive matrix becomes insufficient and thus the utilization of the active material cannot be improved. On the other hand, with a temperature higher than 160° C., the structural change is caused in the nickel hydroxide particles themselves so that they are deteriorated as the active material, furthermore, the heat cost is to be raised. A preferable heat treatment temperature is from 80 to 120° C.

Moreover, it is preferable to operate the magnetoron for oscillating the microwave with the output power in the range from 0.5 to 12 kW with respect to 1 kg of the mixed particles in the mixer. With an output power lower than 0.5 kW, the energy introduced from the microwave into the mixed particles is too small for sufficiently heating the mixed particles homogeneously in the above-mentioned temperature range. On the other hand, with an output power higher than 12 kW, an sufficient effect cannot be obtained in terms of the characteristics.

It is also possible to use a mixer provided with a heating-cooling jacket on the outside with hot water sent into the jacket for having the mixer itself in a high temperature state, and further to apply the heat treatment of the mixed particles with the above-mentioned microwave. The above-mentioned heat treatment may be conducted while sending a high concentration oxygen to the inside of the mixer.

Since production of an active material for a positive electrode according to the present invention is conducted in a mixer with a sealed structure, unlike the case of production with an open system device as disclosed in the official gazette of Japanese Patent Publication Laid-Open No. 9-73900, loss of the water content in the alkaline aqueous solution supplied in the mixer can be prevented. Therefore, the dissolution amount of the cobalt compound particles can be increased so that an active material with a high utilization can be obtained.

A positive electrode of the present invention will be explained.

The positive electrode supports a mixture for a positive electrode mainly containing an active material produced by the above-mentioned method on a collector.

The positive electrode can be provide as the case of a conventional non-sintered type nickel electrode. That is, a consistent paste for positive electrode is prepared by kneading an active material produced by the above-mentioned method, a binder such as carboxy methyl cellulose, methyl cellulose, sodium polyacrylate, and polytetrafluoroethylene, and water with a predetermined ratio.

The paste is filled or applied to a collector such as a three-dimensional substrate of a foamed nickel substrate, a net-like sintered substrate made of metal fibers or a non-woven fabric with the surface applied with nickel plating, and a two-dimensional substrate of a nickel punching sheet or an expanded nickel.

Then, the drying treatment is applied to the entirely, followed by a press forming and cutting so as to be shaped into a predetermined shape.

The production method of an alkaline secondary battery according to the present invention will be explained.

A generating element is provided by placing a separator between the above-mentioned positive electrode and a negative electrode, and the generating element is accommodated in a battery can.

When the purposed alkaline secondary battery to be produced is a nickel-hydrogen secondary battery, a negative electrode supporting a mixture for a negative electrode mainly comprising hydrogen occluded alloy powders is used. When the purposed alkaline secondary battery to be produced is a nickel-cadmium secondary battery, a negative electrode having a cadmium compound such as a metal cadmium and a cadmium hydroxide as the active material is used.

After pouring a predetermined alkaline electrolysis solution into the battery can, the battery can is sealed with an ordinary method so as to assemble a battery precursor.

The amount of the alkaline electrolysis solution to be poured is defined as follows.

That is, it is defined to be the pouring amount with a 0.5 to 1.6 $cm^3$/Ah liquid ratio with respect to the theoretical capacity (unit: Ah) of the positive electrode in the assembled generating element.

With a pouring amount with a more than 1.6 $cm^3$/Ah liquid ratio, realization of a high capacity of the battery is disturbed. With a smaller liquid ratio, it is advantageous in realizing a high capacity of the battery, however, with a less than 0.5 $cm^3$/Ah liquid ratio, the utilization of the positive electrode is declined so as to deteriorate the high ratio discharge characteristic of the battery or the discharge characteristic after leaving.

A preferable pouring amount is an amount with the above-mentioned liquid ratio of 0.8 to 1.2 $cm^3$/Ah.

Finally, the initial charging is conducted to the battery precursor obtained by the above-mentioned process.

At the time of the initial charging, unlike the conventional one, the condition of supplying a quantity of electricity of 100% or more with respect to the theoretical capacity of the positive electrode need not be adopted. Rather, it is preferable to have the initial charging with a less than 100% quantity of electricity to be supplied with respect to the theoretical capacity of the positive electrode. The reason is as follows.

The initial charging is conducted for activating the positive and negative electrodes. In particular, this is an indispensable treatment for the positive electrode containing a cobalt component for forming a conducting matrix of oxycobalt hydroxide by oxidizing the cobalt component and for oxidizing the nickel hydroxide so as to be converted into oxynickel hydroxide. Therefore, in the conventional case, a sufficient quantity of electricity more than the theoretical capacity of the positive electrode is needed to be supplied at the time of the initial charging, expecting the oxidization of the above-mentioned cobalt component. Moreover, in order to completely oxidize the cobalt component prior to the nickel hydroxide, it was regarded as preferable to conduct the initial charging at a low rate.

However, for a positive electrode of the present invention, since the active material is provided in the state where the conductive matrix of the cobalt component is formed already partially or entirely on the positive electrode, formation of the conductive matrix by the initial charging as in the conventional case is not required. That is, since the active material produced according to the present invention is already activated to some extent before the initial charging, the quantity of electricity to be needed for the initial charging may be sufficient even when the quantity of electricity in the initial charging is less than 100% of the theoretical capacity of the positive electrode.

Moreover, since the initial charging need not be conducted with a low current for oxidizing the cobalt component prior to the nickel hydroxide, the initial charging may be conducted sufficiently at a charging rate of 0.5 C or more.

EXAMPLES 1 TO 7, COMPARATIVE EXAMPLE 1

With the device shown in FIG. 2, a predetermined amount of nickel hydroxide particles having a 10 μm average particle size and cobalt hydroxide particles having a 1 μm average particle size were placed in the mixer main body 1 of the mixer with a ratio shown in Table 1 (% by weight). Then, the sealed structure was formed by closing the lid member 2. The weight of the mixed particles was 1 kg.

Then, while moving the agitating blade 3 and the chopper blade 4, an aqueous solution of sodium hydroxide of an 8N concentration was supplied from the nozzle 5 of the lid member 2 by an amount sufficient for wetting the mixture of the particles. While agitating the mixture, the magnetoron was operated at 4.0 kW for irradiating a microwave. The heating treatment was conducted for 20 minutes with the temperature of the mixture at about 100° C. so as to produce an active material.

For the comparison, the mixture used in the production of the active material of the example 4 was soaked in an aqueous solution of sodium hydroxide with a 12N concentration. Then, the entirety was spread evenly on a filter paper, heated at 100° C. for about 30 minutes, and pulverized with a pulverizer. This is referred to as the comparative example 1.

TABLE 1

| | Nickel hydroxide particles (% by weight) | Cobalt hydroxide particles (% by weight) | Treatment | |
| --- | --- | --- | --- | --- |
| | | | Microwave treatment | Agitation |
| Example 1 | 99.8 | 0.2 | yes | yes |
| Example 2 | 99.5 | 0.5 | yes | yes |

TABLE 1-continued

| | Nickel hydroxide particles (% by weight) | Cobalt hydroxide particles (% by weight) | Treatment | |
| --- | --- | --- | --- | --- |
| | | | Microwave treatment | Agitation |
| Example 3 | 95 | 5 | yes | yes |
| Example 4 | 90 | 10 | yes | yes |
| Example 5 | 85 | 15 | yes | yes |
| Example 6 | 80 | 20 | yes | yes |
| Example 7 | 75 | 25 | yes | yes |
| Comparative example 1 | 90 | 10 | no | no |

2. Production of a Positive Electrode

Using the active materials, a nickel electrode was produced as follows.

With respect to 100 parts by weight of each active material, 0.2 part by weight of carboxy methyl cellulose, 1.0 part by weight of a PTFE dispersion (specific gravity 1.5, solid component 60% by weight), and 35 parts by weight of water were added and kneaded so as to prepare a paste for a positive electrode.

The paste was filled into a nickel plating porous sheet having a 95% porosity and a 1.7 mm thickness, dried and rolled so as to have a nickel electrode.

At the time, the filling amount of the active material was adjusted such that the theoretical capacity as the nickel electrode is 1200 mAh.

On the other hand, a negative electrode was produced as follows.

A commercially available mish metal, Ni, Co, Mn and Al were mixed with a molar ratio of 4.0:0.4:0.3:0.3. The mixture was melted in a high frequency melting furnace. The molten product was cooled down for producing an ingot of a hydrogen absorbing alloy with a composition: $MmNi_{4.0}Co_{0.4}Mn_{0.3}Al_{0.3}$ (Mm refers to the mish metal). It was pulverized and classified so as to have alloy powders with a 50 μm or less particle size.

With respect to 95 parts by weight of the alloy powders, 1.0 part by weight of carboxy methyl cellulose, 3.0 parts by weight of a PTFE dispersion (specific gravity 1.5, solid component 60% by weight), 1.0 part by weight of carbon black, and 50.0 parts by weight of water were added so as to prepare a paste for a negative electrode.

The paste was applied on a punching nickel sheet with a 45% opening ratio, dried and rolled so as to obtain a hydrogen absorbing alloy electrode (negative electrode).

3. Evaluation (1) The characteristics were evaluated for the active material of the example 4 and the active material of the comparative example 1 as follows.

A polyolefin non-woven fabric applied with a hydrophilic treatment was provided between the nickel electrode using the active material and the above-mentioned hydrogen absorbing alloy electrode as the separator. By winding the same spirally, two kinds of electrode groups (generating elements) were produced. The electrode groups were accommodated in a battery can, respectively. By pouring an aqueous solution of potassium hydroxide of a 8.5N concentration as the electrolysis solution and placing a sealing plate to the battery can, two kinds of sealed type cylindrical nickel-hydrogen secondary batteries (AA size) were assembled. The capacity per unit weight of active material and the high ratio discharge characteristic were measured unit weight for these batteries by the below-mentioned specification.

The amount of introducing the electrolysis solution in the batteries was set to be a value to satisfy a 1.0 cm³/Ah liquid ratio with respect to the theoretical capacity of each nickel electrode.

Measurement of the capacity per unit weight active material: Charging was conducted for each battery at 360 mA for 5 hours. Then, discharging was conducted at 240 mA until the discharge ending voltage became 1.0V. The discharge capacity at the time was measured. The value obtained by dividing the measured value by the entire weight of the supported mixture (positive electrode compound) was defined as the capacity per the unit weight active material (mAh/g).

Measurement of the high ratio discharge characteristic: Charging was conducted for each battery at 360 mA for 5 hours. Then, discharging was conducted at 2,400 mA until the discharge ending voltage became 1.0V (2 C discharge). The discharge capacity at the time was measured.

Furthermore, charging was conducted for 5 hours. Then, discharging was conducted at 3,600 mA until the discharge ending voltage became 1.0V (3 C discharge). The discharge capacity at the time was measured.

Results of the above-mentioned are shown in Table 2 as a relative value based on the measurement results of the battery assembled with the active material of the comparative example 1 as 100.

TABLE 2

| | Capacity per unit weight of active material | High ratio discharge characteristic | |
|---|---|---|---|
| | | 2C Discharge | 3C Discharge |
| Case of a battery using the active Material of the example 4 | 106 | 237 | 388 |
| Case of a battery using the active Material of the comparative example 1 | 100 | 100 | 100 |

As apparent from Table 2, the battery using the active material of the example 4 is excellent in terms of both capacity per unit weight of active material and high ratio discharge characteristic although it was started from the material the same as that of the active material of the comparative example 1. This is the explicit proof of showing the effectiveness of the treatment by homogeneously heating with a microwave while agitating in the production of the active material.

The example was the case where particles were introduced by 1 kg. It was confirmed that the same characteristic can be obtained in the range of a 0.5 to 3 kg introduction amount.

(2) The utilization of the active materials of the examples 1 to 7 were measured by the following single electrode potential test.

With a nickel electrode produced with the active material of each example, the above-mentioned hydrogen occluded alloy electrode, and an aqueous solution of potassium hydroxide of an 8N concentration of the electrolysis solution, an open system simple cell was assembled.

Charging was conducted to the simple cell at 240 mA for 24 hours. Then, discharging was conducted at 240 mA until the discharge ending voltage became 0.8 V. The discharge capacity at the time was measured.

The discharge capacity was divided by the theoretical capacity of the nickel electrode for calculating the percentage thereof.

Results of the above-mentioned are shown in Table 3.

TABLE 3

| Kind of the nickel electrode | Nickel hydroxide particles (% by weight) | Containing amount of cobalt hydroxide (% by weight) | Utilization of Active material (%) |
|---|---|---|---|
| Case of a nickel electrode supporting the active material of the example 1 | 99.8 | 0.2 | 96 |
| Case of a nickel electrode supporting the active material of the example 2 | 99.5 | 0.5 | 103 |
| Case of a nickel electrode supporting the active material of the example 3 | 95 | 5 | 106 |
| Case of a nickel electrode supporting the active material of the example 4 | 90 | 10 | 107 |
| Case of a nickel electrode supporting the active material of the example 5 | 85 | 15 | 107 |
| Case of a nickel electrode supporting the active material of the example 6 | 80 | 20 | 104 |
| Case of a nickel electrode supporting the active material of the example 7 | 75 | 25 | 95 |

As apparent from Table 3, in producing an active material by the method of the present invention, it is preferable to have the mixed particles by 80 to 99.5% by weight of nickel hydroxide particles and 0.5 to 20% by weight of cobalt hydroxide particles.

EXAMPLES 8 TO 13

In the production condition the same as the example 4 with the mixed particles used for producing the active material of the example 4, except that the concentration of the aqueous solution of sodium hydroxide to be added was changed, various kinds of active materials were produced, and the utilization thereof was measured. Results thereof are shown in Table 4.

TABLE 4

| | Mixed particles for producing the active material | Concentration of an aqueous solution of sodium hydroxide (N) | Utilization of the active material (%) |
|---|---|---|---|
| Example 8 | The same as the example 4 | 0.5 | 98 |
| Example 9 | The same as the example 4 | 1 | 104 |
| Example 10 | The same as the example 4 | 4 | 106 |
| Example 11 | The same as the example 4 | 12 | 108 |
| Example 12 | The same as the example 4 | 14 | 105 |
| Example 13 | The same as the example 4 | 16 | 97 |

As apparent from Table 4, in producing an active material in the present invention, it is preferable to use an aqueous solution of sodium hydroxide of a 1 to 14N concentration.

EXAMPLES 14 TO 19

In the production condition the same as the example 4 with the mixed particles used for producing the active material of the example 4, except that the heat treatment temperature was changed, various kinds of active materials were produced, and the utilization thereof was measured. Results thereof are shown in Table 5.

TABLE 5

| Mixed particles for producing the active material | Heat treatment temperature (° C.) | Utilization of the active material (%) |
| --- | --- | --- |
| Example 14 | THE same as the example 4 | 30 | 98 |
| Example 15 | The same as the example 4 | 35 | 103 |
| Example 16 | The same as the example 4 | 70 | 105 |
| Example 17 | The same as the example 4 | 130 | 107 |
| Example 18 | The same as the example 4 | 160 | 105 |
| Example 19 | The same as the example 4 | 190 | 94 |

As apparent from Table 5, in producing an active material in the present invention, it is preferable to set the heat treatment temperature at 35 to 160° C.

EXAMPLES 20 TO 25

In the production condition the same as the example 4 with 1 kg of the mixed particles used for producing the active material of the example 4, except that the output power of the magnetoron was changed, various kinds of active materials were produced, and the utilization thereof was measured. Results thereof are shown in Table 6.

TABLE 6

| Mixed particles for producing the active material | Output power of the magnetron (kW) | Utilization of the active material (%) |
| --- | --- | --- |
| Example 20 | The same as the example 4 | 0.3 | 98 |
| Example 21 | The same as the example 4 | 0.5 | 104 |
| Example 22 | The same as the example 4 | 1.0 | 106 |
| Example 23 | The same as the example 4 | 8.0 | 108 |
| Example 24 | The same as the example 4 | 12.0 | 105 |
| Example 25 | The same as the example 4 | 16.0 | 97 |

As apparent from Table 6, in producing an active material in the present invention, it is preferable to set the output of the magnetoron at 0.5 to 12.0 kW per 1 kg of the mixed particles.

EXAMPLES 26 TO 37, COMPARATIVE EXAMPLES 2 TO 13

1. Production of the Active Material

To nickel hydroxide particles having a 10 $\mu$m average particle size, 5% by weight of cobalt hydroxide particles having a 2.5 $\mu$m average particle size were mixed for preparing 1 kg of mixed particles, which are the starting material of the active material. As the alkaline aqueous solution, an aqueous solution of sodium hydroxide of an 8N concentration was selected.

The above-mentioned mixed particles were placed in the mixer with the sealed structure shown in FIG. 2. While agitating, an aqueous solution of sodium hydroxide was added thereto by an amount sufficient for wetting the mixed particles, and mixed. While agitating and kneading them, the magnetoron was operated at 4.0 kW for irradiating a microwave. A heat treatment was applied at about 100° C. for 20 minutes so as to provide an active material of the present invention. This is referred to as an active material a1 (example 26).

Moreover, by placing nickel hydroxide particles into an alkaline aqueous solution with the pH value adjusted in a weak base area, and gradually adding an aqueous solution of cobalt sulfate, a powdery material covered with the cobalt hydroxide was prepared. The adhesion amount of the cobalt hydroxide in the powdery material was the amount corresponding to 5% by weight.

The same treatment was conducted to the powdery material as to the active material a1 so as to prepare an active material of the present invention. This is referred to as an active material a2 (example 27).

For the comparison, the mixed particles as the starting material of the active material a1 were used as an active material. This is referred to as an active material a3 (comparative example 2).

2. Production of the Electrode

With the above-mentioned active materials a1, a2, a3, the below-mentioned nickel electrode was produced.

With respect to 100 parts by weight of each active material, 0.25 parts by weight of carboxy methyl cellulose, 0.25 parts by weight of sodium polyacrylate, 3,0 parts by weight of a PTFE dispersion (specific gravity 1.5, solid component 60% by weight) and 35 parts by weight of water were added and kneaded so as to prepare a paste for a positive electrode.

The paste was filled to a nickel plating porous sheet having a 95% porosity and a 1.7 mm thickness, dried and rolled so as to have a nickel electrode.

The filling amount of the active material was adjusted such that the theoretical capacity as the nickel electrode became 4,000 mAh.

Herein, the nickel electrode using the active material a1 is referred to as the nickel electrode b1 (example 28), the nickel electrode using the active material a2 is referred to as the nickel electrode b2 (example 29), and the nickel electrode using the active material a3 is referred to as the nickel electrode b3 (comparative example 3).

On the other hand, a negative electrode was produced as follows.

A commercially available La enriched mish metal, Ni, Co, Mn and Al were mixed with a molar ratio of 4.0:0.4:0.3:0.3. The mixture was melted in a high frequency melting furnace. The molten product was cooled down for producing an ingot of a hydrogen absorbing alloy with a composition: $LmNi_{4.0}Co_{0.4}Mn_{0.3}Al_{0.3}$ (Lm refers to the La enriched mish metal). It was pulverized and classified so as to have alloy powders with a 50 $\mu$m or less particle size.

With respect to 100 parts by weight of the alloy powders, 0.125 parts by weight of carboxy methyl cellulose, 0.5 parts by weight of sodium polyacrylate, 1.5 parts by weight of a PTFE dispersion (specific gravity 1.5, solid component 60% by weight), 1.0 part by weight of carbon black, and 50.0 parts by weight of water were added so as to prepare a paste for a negative electrode.

The paste was applied on a punching nickel sheet with a 45% opening ratio, dried and rolled so as to obtain a hydrogen absorbing alloy electrode (negative electrode).

3. Assembly of a Battery Precursor

A hydrophilic polyolefin non-woven fabric was provided between the above-mentioned nickel electrodes b1, b2, b3 and the hydrogen absorbing alloy electrode as the separator to produce a generating element. It was inserted into a battery can.

Then, an electrolysis solution mainly containing an aqueous solution of potassium hydroxide was poured into the battery can with the liquid ratio shown in Table 7. Then, the opening was sealed so as to assemble various precursors of cylindrical nickel-hydrogen secondary batteries of the 3/4A size with a 4,000 mA nominal capacity.

4. Production of a Battery

Batteries were produced by conducting the initial charging to these battery precursors with the condition shown in Table 7.

5. Evaluation of the Obtained Batteries

After charging the batteries by 0.1 C, discharging was conducted by 0. 2 C until the discharge ending voltage became 1.0V, and the discharge capacity (mAH) at the time was measured. By dividing the value by the initial capacity, the utilization (%) of the active material was calculated.

Moreover, after leaving the battery under the discharge state in the atmosphere of 65° C. for 1 month, 150% charging was conducted by 0.1° C. over 15 hours in the atmosphere of 25° C. Then, discharging was conducted by 0.2 C until the discharge ending voltage became 1.0V. Furthermore, charging was conducted by 1 C for 1.5 hours, and discharging was conducted by IC until the discharge ending voltage became 1.0V. This charging and discharging operation was repeated for 3 cycles. The discharge capacity at the time was measured. By dividing the value by the initial capacity, the capacity recovery ratio (%) was calculated.

Results of the above-mentioned are shown in Table 7 comprehensively.

Furthermore, as to the battery precursor C3-3 of the comparative example 10, 150% charging was conducted by 0.1 C for 15 hours, and the discharging was conducted by 0.5 C until the discharge ending voltage became 1.0V. For the obtained battery, similar to the above, the discharge capacity, the utilization of the active material, and the capacity recovery ratio were measured.

As a result, the discharge capacity was 2,972 mAh, the utilization of the active material was 98%, and the capacity recovery ratio was 85%.

From the above-mentioned results, the following are explicit.

(1) The batteries of the comparative examples 8 to 13 containing the active material produced not according to the present invention (C3 type) are extremely poor compared with the batteries containing the active material produced according to the present invention (C1 type and C2 type) in terms of the discharge capacity, the utilization and the capacity recovery ratio.

TABLE 7

| | | Battery precursor | | | | Battery characteristics | | |
| --- | --- | --- | --- | --- | --- | --- | --- | --- |
| | | nickel electrode | | Liquid | Initial | Discharge | Utilization of the | Capacity |
| | Kind | kind | kind of active material | ratio (cm³/Ah) | charging method | capacity (mAh) | active material (%) | recovery ratio (%) |
| Comparative example 4 | C1-1 | b1 (Example 28) | a1 (Example 26) | 0.3 | 100% charging | 2960 | 73 | 90 |
| Example 30 | C1-2 | b1 (Example 28) | a1 (Example 26) | 0.5 | by 0.5 C for 2 hours | 3802 | 94 | 98 |
| Example 31 | C1-3 | b1 (Example 28) | a1 (Example 26) | 1.0 | → discharging | 3995 | 100 | 101 |
| Example 32 | C1-4 | b1 (Example 28) | a1 (Example 26) | 1.4 | by 0.5 C to 1.0 V | 3900 | 100 | 102 |
| Example 33 | C1-5 | b1 (Example 28) | a1 (Example 26) | 1.6 | | 3603 | 100 | 100 |
| Comparative example 5 | C1-6 | b1 (Example 28) | a1 (Example 26) | 1.7 | | 3355 | 102 | 100 |
| Comparative example 6 | C2-1 | b2 (Example 29) | a2 (Example 27) | 0.3 | 100% charging | 2871 | 69 | 91 |
| Example 34 | C2-2 | b2 (Example 29) | a2 (Example 27) | 0.5 | by 0.5 C for 2 hours | 3812 | 95 | 78 |
| Example 35 | C2-3 | b2 (Example 29) | a2 (Example 27) | 1.0 | → discharging by 0.5 C | 3998 | 101 | 101 |
| Example 36 | C2-4 | b2 (Example 29) | a2 (Example 27) | 1.4 | to 1.0 V | 3910 | 100 | 100 |
| Example 37 | C2-5 | b2 (Example 29) | a2 (Example 27) | 1.6 | | 3597 | 100 | 101 |
| comparative example 7 | C2-6 | b2 (Example 29) | a2 (Example 27) | 1.7 | | 3324 | 102 | 100 |
| Comparative example 8 | C3-1 | b3 (Comparative example 3) | a3 (Comparative example 2) | 0.3 | 100% charging by 0.5 C | 2356 | 59 | 92 |
| Comparative example 9 | C3-2 | b3 (Comparative example 3) | a3 (Comparative example 2) | 0.5 | for 2 hours → discharging | 2722 | 69 | 84 |
| Comparative example 10 | C3-3 | b3 (Comparative example 3) | a3 (Comparative example 2) | 1.0 | by 0.5 C to 1.0 V | 3205 | 81 | 80 |
| Comparative example 11 | C3-4 | b3 (Comparative example 3) | a3 (Comparative example 2) | 1.4 | | 3150 | 85 | 85 |
| Comparative example 12 | C3-5 | b3 (Comparative example 3) | a3 (Comparative example 2) | 1.6 | | 3101 | 87 | 86 |
| Comparative example 13 | C3-6 | b3 (Comparative example 3) | a3 (Comparative example 2) | 1.7 | | 3029 | 89 | 85 |

From the above-mentioned, the effectiveness of the active material produced by the method of the present invention is apparent.

(2) However, as apparent from the comparison between the batteries of the examples 30 to 33 and the batteries of the comparative examples 4 and 5, or between the batteries of the examples 34 to 37 and the batteries of the comparative examples 6 and 7, even with the same kind of the active material used at the time of producing the battery, the discharge capacity 30 is declined drastically if the liquid ratio of the electrolysis solution to be poured is outside the range from 0.5 to 1.6 cm$^3$/Ah.

From the above-mentioned, it was learned that the liquid ratio of the electrolysis solution should be set at 0.5 to 1.6 cm$^3$/Ah, even in assembling a battery with an active material produced by the method of the present invention.

COMPARATIVE EXAMPLES 14 TO 19

An active material of the "embodiment 1" disclosed in the official gazette of Japanese Patent Publication Laid-Open No. 9-73900, produced in an open hot air convection type device was prepared as an active material a4 (comparative example 14). Furthermore, only nickel hydroxide particles were prepared as an active material a5 (comparative example 15).

With the active materials, as in the case of the nickel electrodes of the example 28 and the example 29, a nickel electrode was produced. The nickel electrode using the active material a4 is referred to as the nickel electrode b4 (comparative example 16), and the nickel electrode using the active material a5 is referred to as the nickel electrode b5 (comparative example 17).

Using the nickel electrodes, battery precursors were assembled as in the examples 30 to 37. The battery using the nickel electrode b4 is the comparative example 18, and the battery using the nickel electrode b5 is the comparative example 19.

To the assembled battery precursors, 150% initial charging was conducted by 0.5 C at 25° C., and discharging was conducted by 0.5 C until the battery voltage became 1.0 V.

After charging the batteries by 0.1 C, discharging was conducted by 0.2 C until the discharge ending voltage became 1.0V. The discharge capacity (actual capacity: mAh) was measured. The utilization of the active material (%) was calculated by divided the value by the theoretical capacity.

Moreover, after leaving the battery under the discharge state in the atmosphere of 65° C. for 1 month, 150% charging was conducted by 0.1 C over 15 hours in the atmosphere of 25° C. Then, discharging was conducted by 0.2 C until the discharge ending voltage became 1.0V. Furthermore, charging was conducted by 1 C for 1.5 hours, and discharging was conducted by 1 C until the discharge ending voltage became 1.0V. This charging and discharging operation was repeated for 3 cycles. The discharge capacity at the time was measured. By dividing the value by the initial capacity, the capacity recovery ratio (%) was calculated.

As a result, the utilization of the active material and the capacity recovery ratio of the battery of the comparative example 18 were 93% and 81% respectively. In the case of the battery of the comparative example 19, they were 81% and 80%, respectively.

As heretofore mentioned, according to the method of the present invention, an active material with a high utilization in an alkaline secondary battery, capable of drastically improving the high ratio discharge characteristic of the battery, and restraining the decline of the discharge capacity even at the time of recharging after leaving in the over discharge state for a long time, can be produced.

Moreover, since an active material produced by the method of the present invention can hardly deteriorate even after a long term storage, it allows easy management.

Furthermore, since a high rate initial charging is allowed for the initial charging of a battery assembled with the active material, unlike the conventional case with the initial charging with a low rate for a long time, the production (initial charging) time of the battery can be shortened compared with the conventional case, and thus the production efficiency can be improved.

Moreover, according to the production method of an active material for a positive electrode of the present invention, an active material applied with the alkaline heat treatment can be processed to a paste with an agitating-kneading device used for the production, and the paste can be filled directly into the collector after passing through a discharge chute.

What is claimed is:

1. A method of producing an active material for a positive electrode of an alkaline secondary battery, comprising:

mixing particles comprising first particles mainly containing nickel hydroxide and second particles of a metal cobalt or a cobalt compound in a mixer with a sealed structure; and simultaneously heating the mixture of particles by irradiating the mixture of particles with radiation beams in the presence of oxygen and an alkaline aqueous solution.

2. The production method according to claim 1, wherein the mixture of particles comprises 0.5 to 20% by weight metal cobalt or the cobalt compound.

3. The production method according to claim 1, wherein the alkaline aqueous solution comprises a 1 to 14N alkaline aqueous solution.

4. The production method according to claim 1, wherein said mixing step comprises:

closing an opening atop a mixer main body using a lid member;

stirring the bottom part of the mixer main body with a horizontally rotatable stirring blade;

chopping with a vertically rotatable chopper blade provided on the side wall in the vicinity of the bottom part of the mixer main body, wherein a part of the mixer main body above the chopper blade being a cylindrical member with a circular truncated conical shape.

5. The production method according to claim 1, wherein said irradiating step comprises irradiating the mixture of particles with microwave.

6. The production method according to claim 5, wherein said irradiating step comprises operating a magnetoron with a 0.5 to 12 kW output power.

7. The production method according to claim 1, wherein the particles are mixed while being heated to a temperature between 35 to 160° C.

8. A method of producing an alkaline secondary battery, comprising:

producing a generating element comprising a positive electrode, a separator, and a negative electrode, said positive electrode including an active material produced by mixing particles comprising first particles mainly containing nickel hydroxide and second particles of a metal cobalt or a cobalt compound in a mixer with a sealed structure, and simultaneously heating the mixture of particles by irradiating the mixture of particles with radiation beams in the presence of oxygen and an alkaline aqueous solution;

accommodating the generating element in a battery can;

pouring an alkaline electrolysis solution into the battery can with a liquid ratio corresponding to 0.5 to 1.6 cm$^3$/Ah relative to the theoretical capacity of the positive electrode;

sealing the battery can to assemble a battery precursor; and conducting an initial charging of the battery precursor.

9. The production method according to claim 8, wherein the initial charging is conducted with a charging capacity of 100% or less than the theoretical capacity of the positive electrode.

10. The production method according to claim 8, wherein the initial charging is conducted with a 0.5 C or higher charging rate.

11. The production method according to claim 1, wherein the mixing particles step comprises mixing an agglomerate of third particles with the surface of said third particles mainly containing nickel hydroxide adhered with a metal cobalt or a cobalt compound.

12. A method of producing an active material for a positive electrode of an alkaline secondary battery, comprising:

mixing an agglomerate of particles comprising particles mainly containing nickel hydroxide and having a metal cobalt or a cobalt compound adhering to the surfaces of the particles, in a mixer with a sealed structure; and simultaneously heating the agglomerate of the particles by irradiating the agglomerate of the particles with radiation beams in the presence of oxygen and an alkaline aqueous solution.

13. The production method according to claim 12, wherein the agglomerate of the particles comprises 0.5 to 20% by weight metal cobalt or the cobalt compound.

14. The production method according to claim 12, wherein the alkaline aqueous solution comprises a 1 to 14N alkaline aqueous solution.

15. The production method according to claim 12, wherein said mixing step comprises:

closing an opening atop a mixer main body using a lid member;

stirring the bottom part of the mixer main body with a horizontally rotatable stirring blade;

chopping with a vertically rotatable chopper blade provided on the side wall in the vicinity of the bottom part of the mixer main body, wherein a part of the mixer main body above the chopper blade being a cylindrical member with a circular truncated conical shape.

16. The production method according to claim 12, wherein said irradiating step comprises irradiating the agglomerate of particles with microwaves.

17. The production method according to claim 16, wherein said irradiating step comprises operating a magnetoron with a 0.5 to 12 kW output power.

18. The production method according to claim 12, wherein the agglomerate of particles are mixed while being heated to a temperature between 35 to 160° C.

19. A method of producing an alkaline secondary battery, comprising:

producing a generating element comprising a positive electrode, a separator, and a negative electrode, said positive electrode including an active material produced by mixing an agglomerate of particles comprising particles mainly containing nickel hydroxide and having a metal cobalt or a cobalt compound adhering to the surfaces of the particles, in a mixer with a sealed structure, and simultaneously heating the agglomerate of particles by irradiating the agglomerate of particles with radiation beams in the presence of oxygen and an alkaline aqueous solution;

accommodating the generating element in a battery can;

pouring an alkaline electrolysis solution into the battery can with a liquid ratio corresponding to 0.5 to 1.6 cm$^3$/Ah relative to the theoretical capacity of the positive electrode;

sealing the battery can to assemble a battery precursor; and conducting an initial charging of the battery precursor.

20. The production method according to claim 19, wherein the initial charging is conducted with a charging capacity of 100% or less than the theoretical capacity of the positive electrode.

21. The production method according to claim 19, wherein the initial charging is conducted with a 0.5 C or higher charging rate.

* * * * *